United States Patent
Tachibana

[19]

[11] Patent Number: 5,847,800
[45] Date of Patent: Dec. 8, 1998

[54] LENS HOLDING MECHANISM OF SPECTACLES

[76] Inventor: Hideaki Tachibana, 10-15, Sanrokucho 1-chome, Sabae-shi, Fukui 916, Japan

[21] Appl. No.: 943,271

[22] Filed: Oct. 3, 1997

[30] Foreign Application Priority Data

Dec. 13, 1996 [JP] Japan .................................. 8-333320
Feb. 18, 1997 [JP] Japan .................................. 9-033470
Jul. 4, 1997 [JP] Japan .................................. 9-179994

[51] Int. Cl.⁶ .................................................. G02C 1/02
[52] U.S. Cl. ........................ 351/110; 351/103; 351/106
[58] Field of Search ........................... 351/110, 111, 351/103, 106, 83, 86, 91, 92, 90, 41, 124, 140

[56] References Cited

U.S. PATENT DOCUMENTS 5,646,706   7/1997   Izumitani ............................. 351/110

Primary Examiner—Hung Xuan Dang
Attorney, Agent, or Firm—Ronald R. Snider

[57] ABSTRACT

The present invention is to provide a lens holding mechanism of a pair of rimless spectacles whereby the lenses can be securely held in check without an intricate structure therefore. According to this mechanism, a concave portion is notched on the side surface of the lens while a joint member, on the surface of which a groove capable of being fitted into said concave portion is formed, is provided on a proximal end portion with regard to the lens of an endpiece to pivotally and foldably support a temple or both ends of a bridge to connect a pair of lenses juxtaposed to each other. In order to prevent this joint member from slipping out of the concave portion of the lens, basically, a recess portion is provided on the groove of the joint member while a protrusive portion to fit into said recess is provided on the concave portion of the lens. Thereby, it becomes possible to securely hold the lenses in check with the endpiece or the bridge by means of an extremely simple structure.

6 Claims, 14 Drawing Sheets

F I G. 27
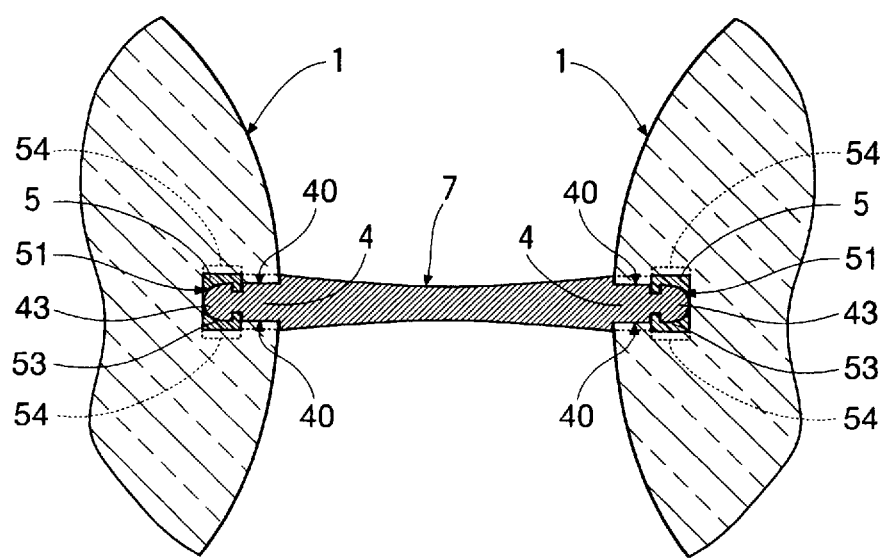

5,847,800

LENS HOLDING MECHANISM OF SPECTACLES

RELATED APPLICATIONS

This application claims the priority of Japanese Patent Application No. 8-333320, filed on Dec. 13, 1996, Japanese Patent Application No. 9-33470, filed on Feb. 18, 1997, and Japanese Patent Application No. 9-179994, filed on Jul. 4, 1997, which are incorporated herein by reference.

1. Technical Field

The present invention relates to a lens holding mechanism of spectacles, in more detail, it concerns said mechanism for rimless spectacles where the lenses can be securely held in check without fluctuation by means of an extremely simple structure.

2. Background Art

Recently, a pair of spectacles not only which has widefield vision and weighs light, but also whose design is refined is much favored by the spectacles wearers, especially, a so-called "rimless spectacles" is popular among them where the bridge member connecting a pair of right-and-left lenses juxtaposed to each other and the endpieces each pivotally and foldably supporting a temple are directly screwed in a hole bored in the vicinity of the circumferential edge of the lenses so that the rim surrounding the lenses becomes unnecessary.

However, with such conventional rimless spectacles as mentioned above, it has been pointed out that a screw-in portion to hold the lenses through the holes bored on them slacks owing to wear or external force such as vibration. That is to say, conventionally, the holding of the lenses has been secured by attaching support members on the endpieces as well as the bridge and abutting those support members on the side surface of the lenses so as to be screwed in the holes bored thereon. The structure of such rimless spectacles is so fragile that the bridge and the endpieces become unavoidably vulnerable to deformation due to external force or the bore of the holes on the lenses becomes enlarged due to wear. The deformation of those parts owing to such physical cause as mentioned above makes the abutment of those support members on the side surface of the lenses insufficient, so that the lens holding portions become susceptible to fluctuation.

In addition to the foregoing, the fashion-conscious spectacles wearers have begun to demand the further simplicity of the design on the lens holding portions and that of the construction of the spectacles on the whole. They have come to become unsatisfied with those support members of the conventional rimless spectacles, demanding that they should be removed. That is just because those support members have prevented the highly sought-after simplicity of the rimless spectacles in structure.

Thus, the present invention is to provide a lens holding mechanism of spectacles where the lenses can be securely held in check without fluctuation while the further simplicity of the design can be realized by means of an extremely simple structure.

DISCLOSURE OF THE INVENTION

In the present invention, along with a concave portion notched on the side surface of the lens, a joint member with a groove capable of being inserted in said concave portion is provided on either a proximal end portion with regard to the lens of an endpiece to pivotally and foldably support a temple or both ends of the bridge to connect a pair of right-and-left lenses juxtaposed to each other. In order to prevent this joint member from slipping out of the concave portion of the lens, basically, a recess portion and a protrudent portion to be interengaged with each other are provided on the groove of the joint member and the concave portion of the lens respectively. Thereby, it becomes possible to securely hold the lenses in check with an extremely simple structure.

BRIEF DESCRIPTION OF THE DRAWINGS

FIG. 27 is a partly cross sectional view at the bridge showing the holding condition of the lens in the fourth embodiment.

BEST MODE FOR CARRYING OUT THE INVENTION

Hereinafter, the present invention is described in more detail on the basis of the embodiments shown in the accompanying drawings.

Firstly, with reference to FIGS. 1 to 9, the lens holding mechanism by means of the first embodiment of the present invention is explained.

(FIRST EMBODIMENT)

Figure 1:
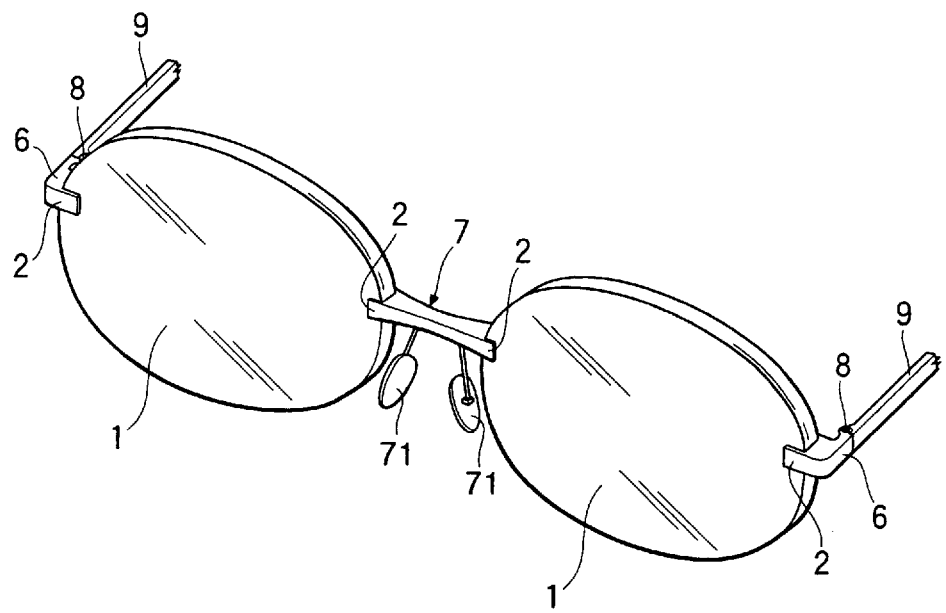
FIG. 1 a partly perspective view of a pair of rimless spectacles adopting the lens holding mechanism described in the first embodiment of the present invention.
Figure 2:
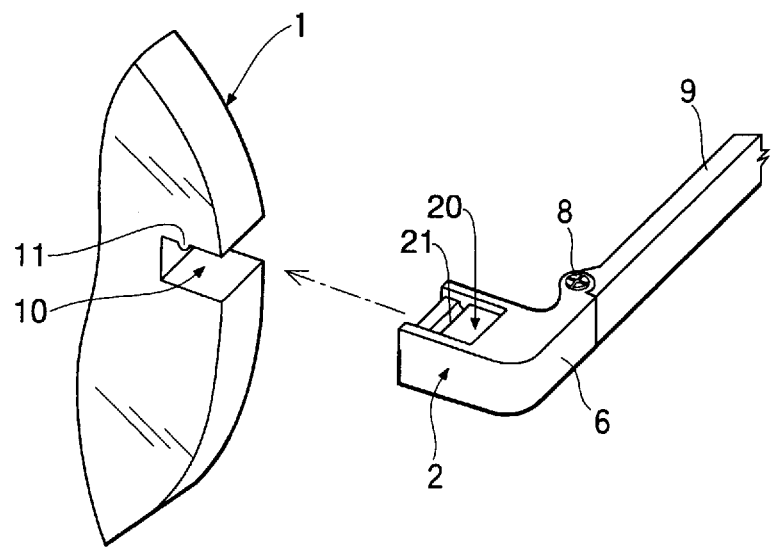
FIG. 2 is an exploded perspective view at the endpiece of the lens holding mechanism in the first embodiment.
Figure 3:
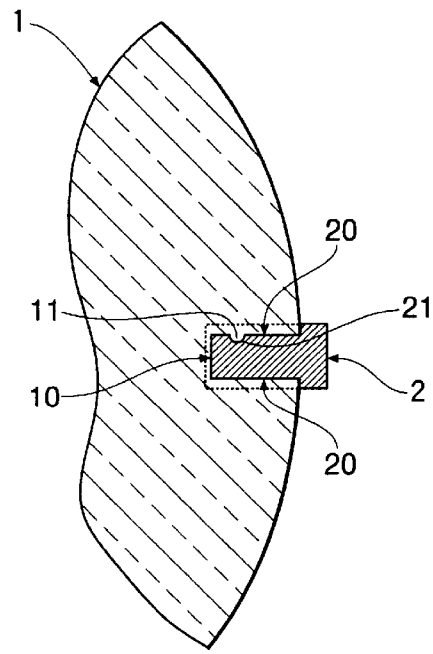
FIG. 3 is a partly cross sectional view at the endpiece showing the holding condition of the lens in the first embodiment.
Figure 7:
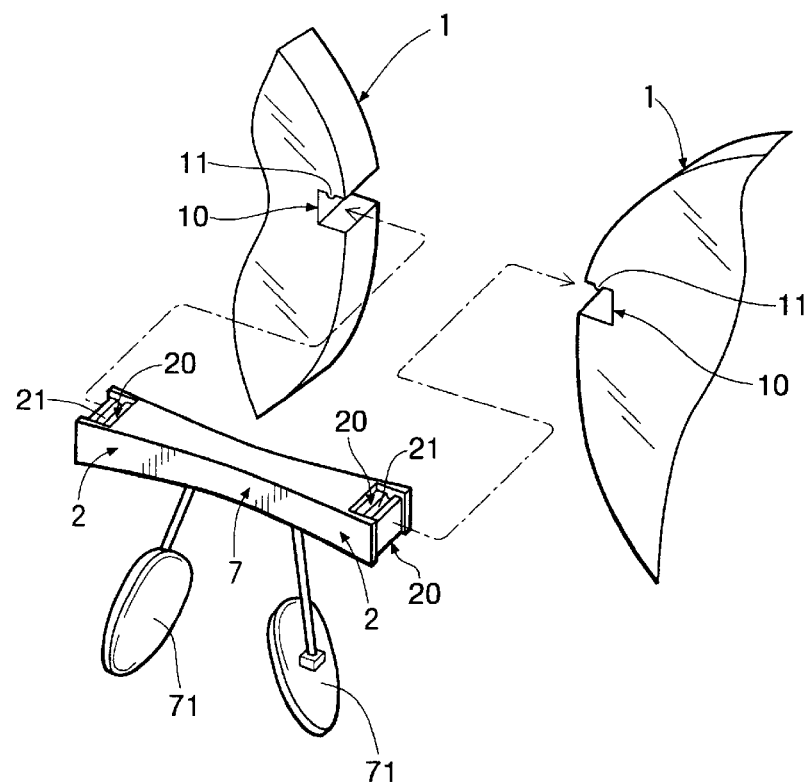
FIG. 7 is an exploded perspective view at the bridge of the lens holding mechanism in the first embodiment.
Figure 8:
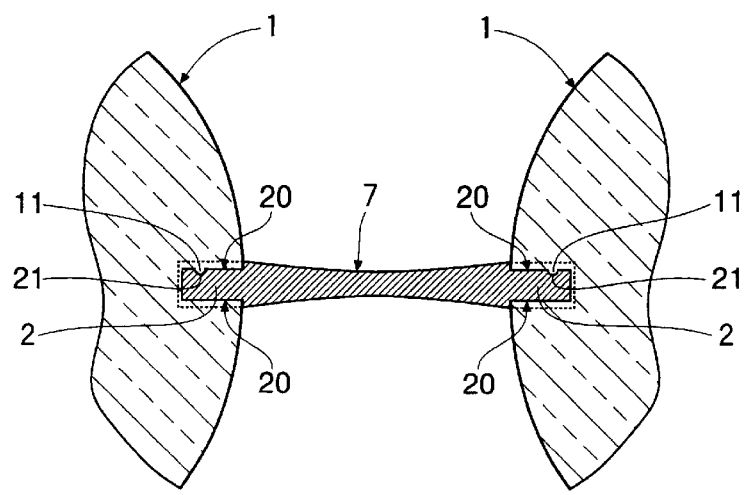
FIG. 8 is a partly cross sectional view at the bridge showing the holding condition of the lens in the first embodiment.
Figure 9:
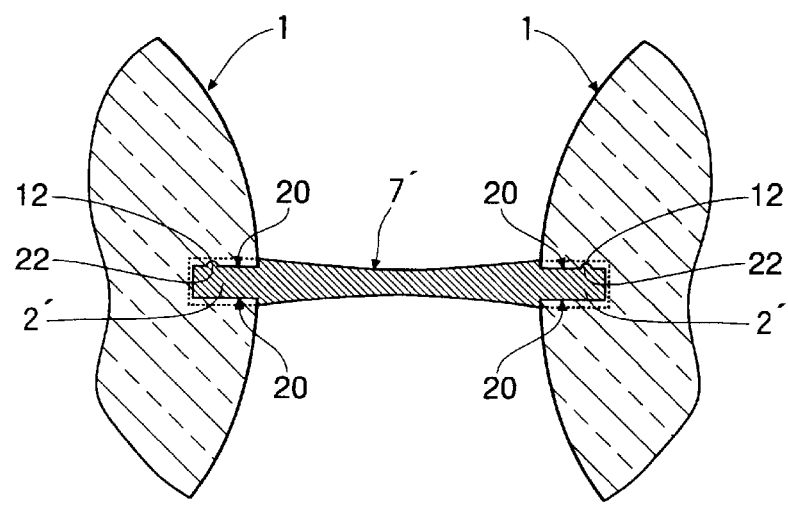
FIG. 9 is a partly cross sectional view at the bridge of modification in the first embodiment.
Figure 10:
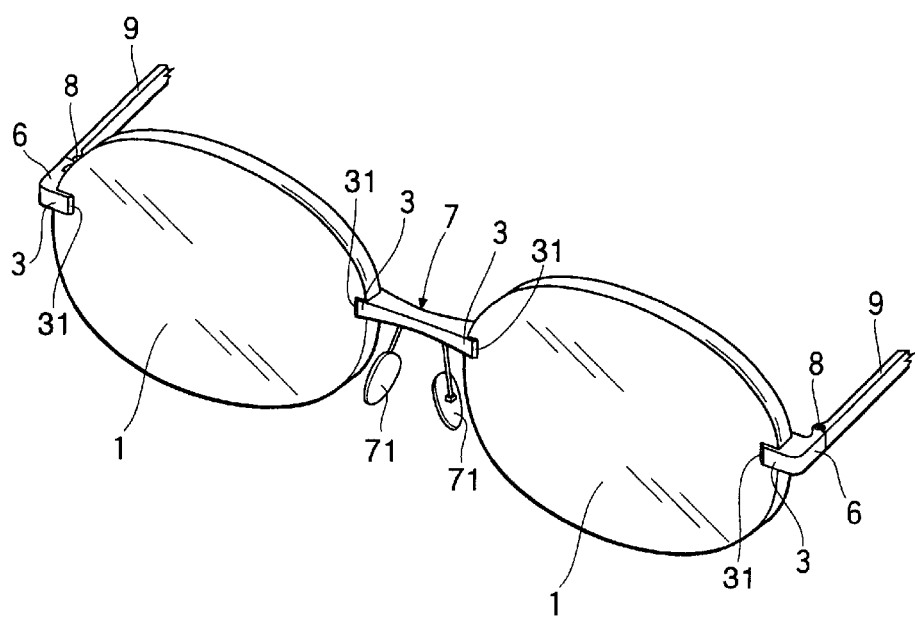
FIG. 10 is a partly perspective view of the rimless spectacles adopting the lens holding mechanism described in the second embodiment of the present invention.
Figure 11:
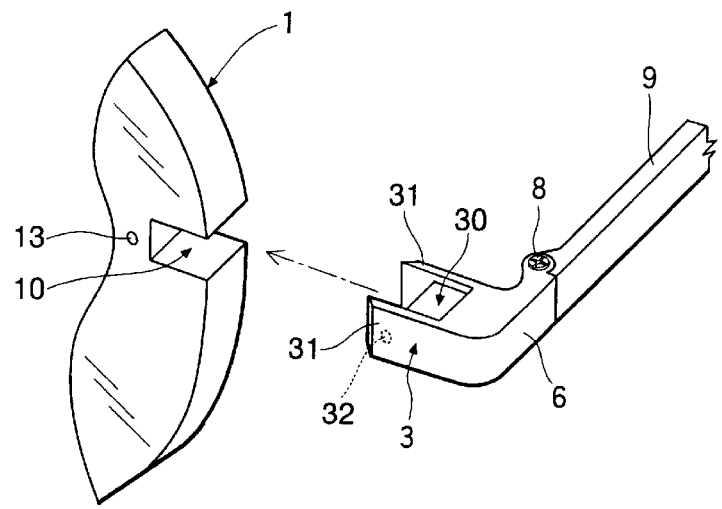
FIG. 11 is an exploded perspective view at the endpiece of the lens holding mechanism in the second embodiment.
Figure 12:
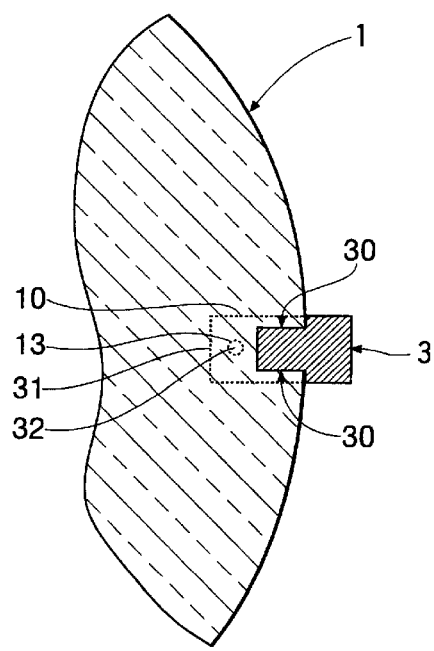
FIG. 12 is a partly cross sectional view at the endpiece showing the holding condition of the lens in the second embodiment.
Figure 13:
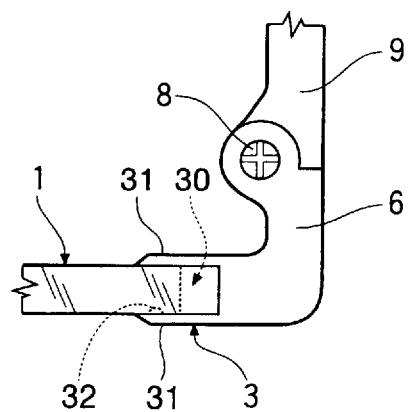
FIG. 13 is a partly plan view at the endpiece of the holding condition of the lens in the second embodiment.

The lens holding mechanism of the present embodiment is shown in FIG. 1 whereby the endpieces (6) and (6) each pivotally and foldably supporting a temple (9) by way of a hinge (8) are securely engaged to the outer fringe portions of the right-and-left lenses (1) and (1) juxtaposed to each other while the bridge (7) from which a pair of nose pads (71) and (71) are suspended is securely engaged to the inner fringe portions thereof. FIGS. 2 to 6 show the lens holding mechanism of the present embodiment adopted at the endpiece (6) while FIGS. 7 to 9 show said mechanism adopted at the bridge (7) part.

In the drawings, what is indicated with a reference mark (1) is a pair of lenses made of a synthetic resin. A concave portion (10) is sideways notched on the inner and outer fringe sides of the lens (1) respectively. One semi-cylindrical projection (11) is provided on the top surface of said concave portion (10). In the drawings, what is indicated with a reference mark (2) is a joint member preliminarily provided in integral structure on a proximal end portion with regard to the lens of the endpiece (6) (refer to FIG. 2) and both ends of the bridge (7) (refer to FIG. 7). Both the endpiece (6) and the bridge (7) are made of a synthetic resin. Grooves (20) and (20) having the width corresponding to the lens thickness or wide enough to be inserted into the concave portion (10) of the lens (1) are provided on the upper and lower surfaces of the joint member (2) while a semi-cylindrical recess (21) capable of receiving said projection (11) is provided on the groove (20) of the upper surface of the joint member (2).

Just by inserting the grooves (20) and (20) of the joint members (2) into the concave portions (10) of the lenses (1) and engaging the recesses (21) of the grooves (20) with the projections (11), it becomes possible to securely fix the lenses (1) with the endpieces (6) and the bridge (7) without fluctuation, so that a pair of rimless spectacles (refer to FIG. 1) can be assembled in a simple manner.

In this way, with the lens holding mechanism of the present embodiment, since the lenses are held in check by providing the projection (11) on the concave portion (10) and fitting this projection into the recess (21) provided on the groove (20) of the joint member (2), it becomes unnecessary to attach support members on the endpieces (6) and the bridge (7) as in the conventional rimless spectacles, with the result that it can not only considerably simplify the lens holding mechanism, but also enhance the simplicity of the design of the rimless spectacles. Likewise, since an assemble screw to hold the lens in check can be removed, there is no case where its head does damage on the appearance or narrows the wearers' field of vision as in the conventional rimless spectacles.

Moreover, with the lens holding mechanism of the present embodiment, since the side surfaces slightly extending from the upper and lower grooves (20) and (20) of the joint member (2) lie over the surface of the lens (1) around the concave portion (10) (refer to dotted lines in FIGS. 3 and 8), the joint member (2) is stably fixed on the concave portion (10) so that it becomes possible to securely hold the lenses in check. Also, because the side surfaces extending from the upper and lower grooves (20) and (20) can cover and hide a portion of the lens where said grooves (20) and (20) engage said concave portion (10), there is no case where this portion does damage on the shapely appearance of the rimless spectacles.

The first embodiment of the present invention has been substantially described up to here, but it is not limited to the foregoing and can be modified in various manners within the scope of the accompanying patent claims.

Figure 4:
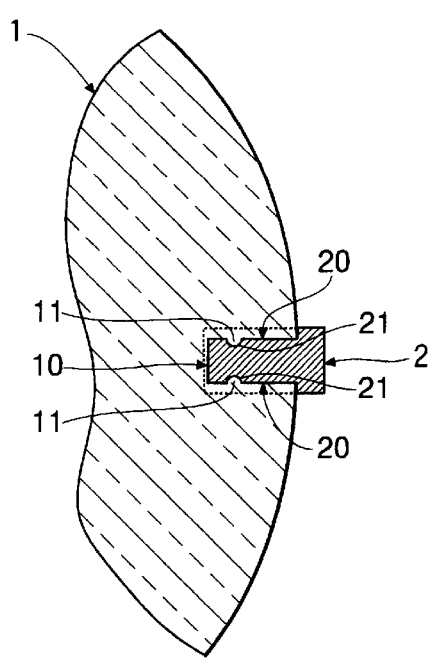
FIGS. 4 to 6 are partly cross sectional views at the endpiece of modifications in the first embodiment.
Figure 5:
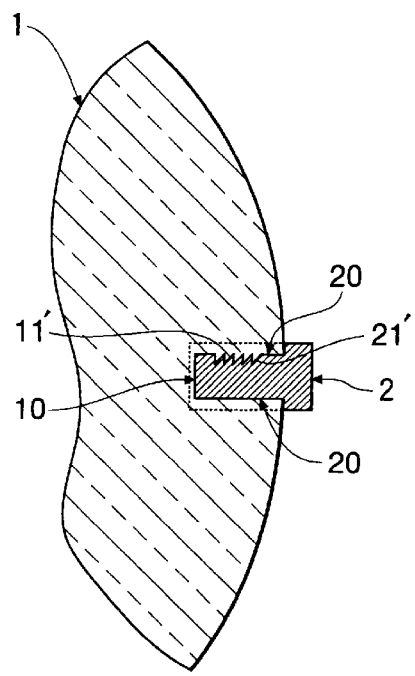

For example, although a single projection (11) is provided on the upper surface of the concave portion (10) of the lens (1) in the present embodiment, it is not the whole story. It is also possible to further enhance the assuredness of the holding of the lenses by providing the projection (11) on both the upper and lower surfaces of the concave portion (10) as shown in FIG. 4 or to facilitate the insertion of the joint member (2) by providing the plural number of indented projections (11') inclined only in the direction of the outer fringe of the lens on the concave portion (10) as shown in FIG. 5.

Figure 6:
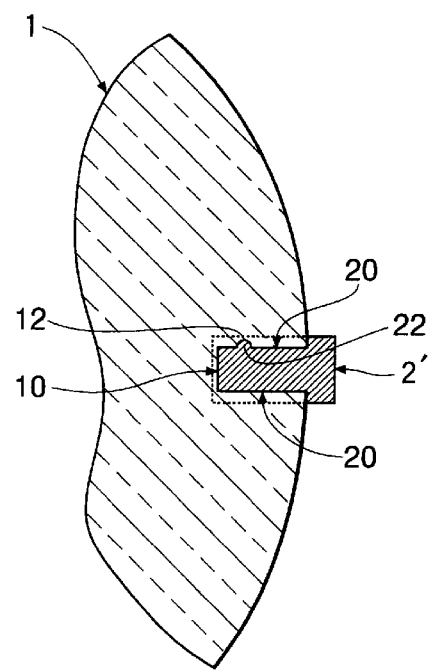

Likewise, as shown in FIGS. 6 and 9, on the contrary with the above-mentioned embodiment, it does not matter whether at least one recess (12) is provided on the concave portion (10) of the lens (1) while a projection (22) capable of being fitted into said recess (12) is provided on the groove (20) of a joint member (2'). Taking the processing cost of the concave portion (10) of the lens (1) and the groove (20) of the joint member (2') into consideration, they can be modified in various manners.

Furthermore, although the first embodiment shows a groove (20) provided on both the upper and lower surfaces of the joint member (2), it is not limited to this arrangement. It does not matter whether a groove (20) is provided only on either the upper or lower surface of the joint member (2). In the present invention, the most important thing is that the end surface of the joint member (2) partially diminishes in thickness by providing a groove (20) on both the upper and lower surfaces of the joint member (2) or either one of those surfaces.

(SECOND EMBODIMENT)

Then, the lens holding mechanism in the second embodiment of the present invention is described with reference to FIGS. 10 to 18. FIGS. 11 to 14 show that said mechanism is adopted at the endpiece (6) while FIGS. 15 to 18 show that it is adopted at the bridge (7).

In the drawings, what is indicated with a reference mark (1) is a pair of lenses made of a synthetic resin. A concave portion (10) is sideways notched on the inner and outer fringe sides of the lens (1) respectively. A single hemispherical recess (13) is provided on the frontal surface of the lens beside this concave portion (10). In the drawings, what is indicated with a reference mark (3) is a joint member preliminarily provided in integral structure on a proximal end portion with regard to the lens of the endpiece (6) (refer to FIG. 11) and both ends of the bridge (7) (refer to FIG. 15). Both the endpieces (6) and the bridge (7) are made of a synthetic resin. Grooves (30) and (30) having the width corresponding to the lens thickness or wide enough to be inserted into the concave portion (10) of the lens (1) are provided on the upper and lower surfaces of the joint member (3) while a pair of flange portions (31) and (31) to partially cover both the frontal and rear surfaces of the lens (1) are provided on the tip end of the joint member (3). A single hemispherical projection (32) capable of being fitted into said recess (13) is provided on the inner surface of just the flange portion (31) partially covering the frontal surface of the lens (1).

Just by inserting the grooves (30) and (30) of the joint members (3) into the concave portions (10) of the lenses (1) and fitting the projections (32) of the flange portions (31) into the recesses (13) of the lenses, it becomes possible to securely fix the lenses (1) with the endpieces (6) and the bridge (7) without fluctuation, so that a pair of rimless spectacles (refer to FIG. 10) can be assembled in an extremely simple manner.

In this way, with the lens holding mechanism of the present embodiment, since the lenses are held in check by providing the recess (13) on the frontal surface of the lens beside the concave portion (10) notched thereon and fitting the projection (32) provided on the flange portion (31) of the joint member (3) into the recess (13), it becomes unnecessary to attach support members on the endpieces (6) and the bridge (7) as in the conventional rimless spectacles, with the result that it can not only considerably simplify the lens holding mechanism, but also enhance the simplicity of the design of the rimless spectacles. Likewise, because an assemble screw to hold the lens in check can be removed, there is no case where its head does damage on the appearance or narrows the wearers' field of vision as in the conventional rimless spectacles.

Moreover, with the lens holding mechanism of the present embodiment, since the side surfaces slightly extending from the upper and lower grooves (30) and (30) of the joint member (3) as well as the flange portions (31) and (31) lie over the surface of the lens (1) around the concave portion (10) (refer to dotted lines in FIGS. 12 and 16), the joint member (3) is stably fixed on the concave portion (10) so that it becomes possible to securely hold the lenses in check. Also, because the side surfaces extending from the upper and lower grooves (30) and (30) as well as the flange portions (31) and (31) can cover and hide a portion of the lens where said grooves (30) and (30) engage said concave portion (10), there is no case where this portion does damage on the shapely appearance of the rimless spectacles.

The second embodiment of the present invention has been substantially described up to here, but it is not limited to the foregoing and can be modified in various manners within the scope of the accompanying patent claims.

Figure 14:
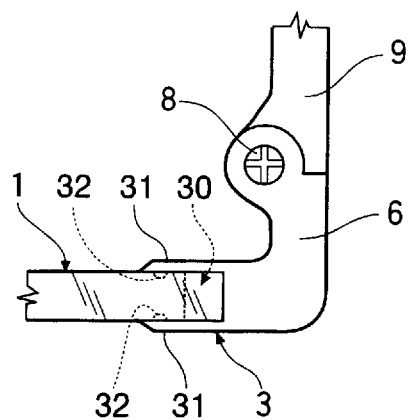
FIG. 14 is a partly plan view at the endpiece of modification in the second embodiment.
Figure 15:
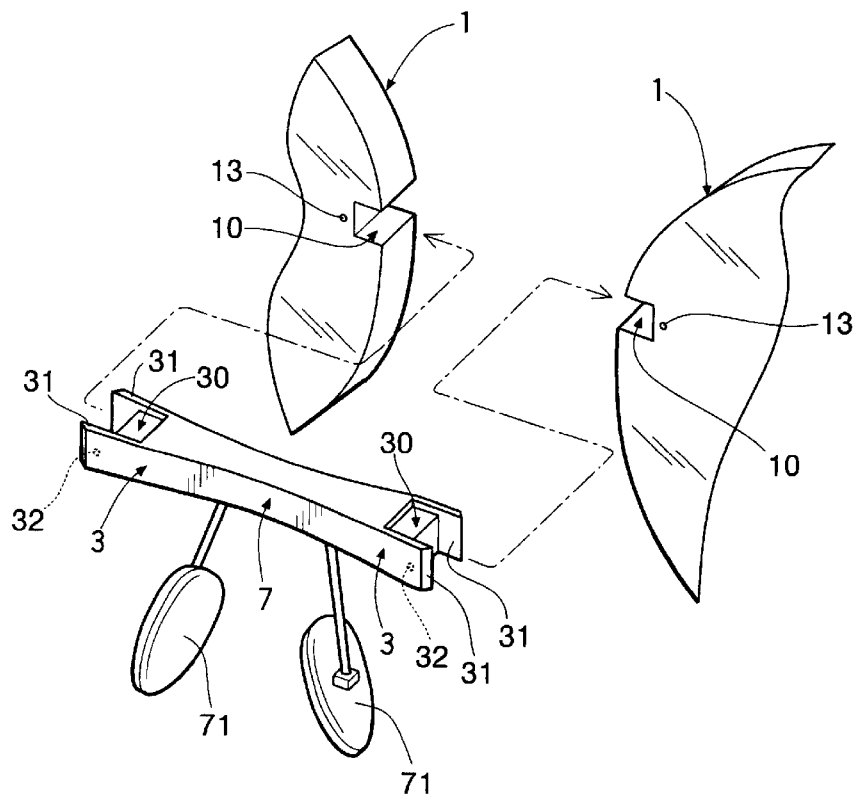
FIG. 15 is an exploded perspective view at the bridge of the lens holding mechanism in the second embodiment.
Figure 16:
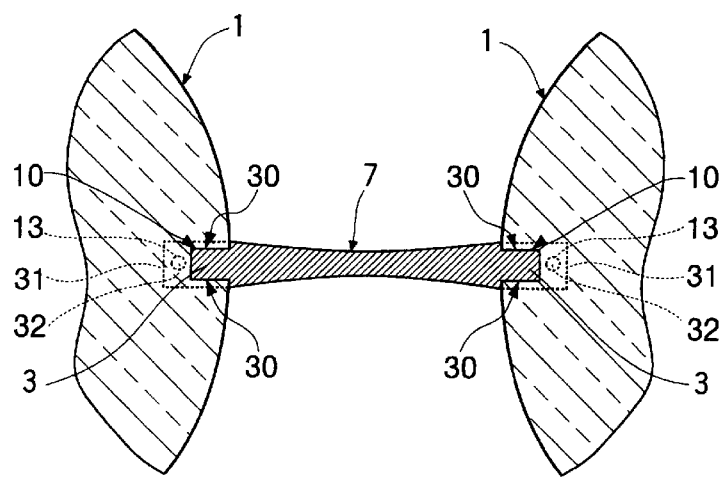
FIG. 16 is a partly cross sectional view at the bridge showing the holding condition of the lens in the second embodiment.
Figure 17:
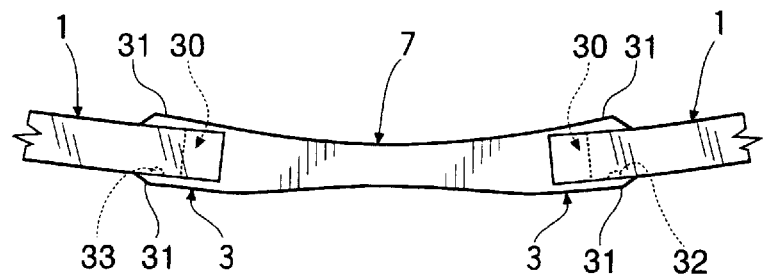
FIG. 17 is a partly plan view at the bridge showing the holding condition of the lens in the second embodiment.
Figure 18:
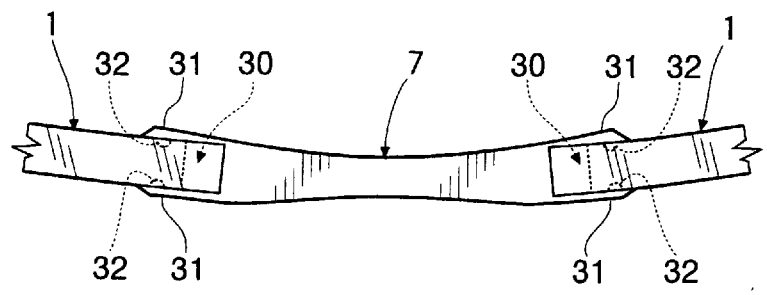
FIG. 18 is a partly plan view at the bridge of modification in the second embodiment.
Figure 19:
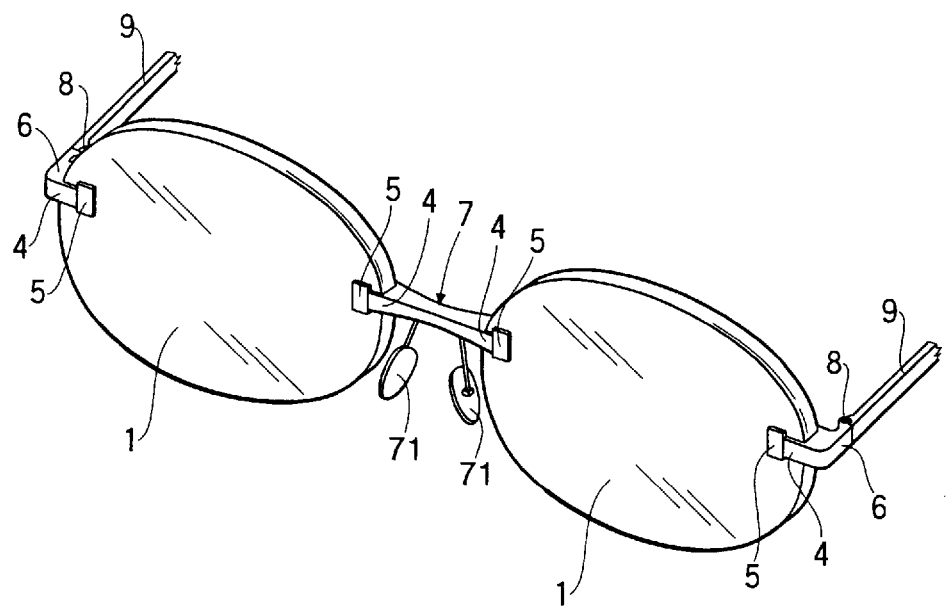
FIG. 19 is a partly perspective view of the rimless spectacles adopting the lens holding mechanism described in the third embodiment of the present invention.

For example, although a single projection (32) is provided just on the flange portion (31) partially covering the frontal surface of the lens in the present embodiment, it is not the whole story. It is also possible to further enhance the assuredness of the holding of the lenses by providing the projection (32) on the inner surface of the respective flange portion (31) as shown in FIGS. 14 and 18. In this case, it is needless to say that the recess (13) needs to be provided on both the frontal and rear surfaces of the lens (1). Of course, in turn, it is no problem either that the projection (32) is provided on the flange portion (31) partially covering the rear surface of the lens (1).

Furthermore, although the second embodiment shows grooves (30) and (30) each provided on the upper and lower surfaces of the joint member (3), it is not limited to this arrangement. It does not matter whether a groove (30) is provided on either the upper or lower surface of the joint member (3). In the present invention, the most important thing is that the end surface of the joint member (3) partially diminishes in thickness by providing a groove (30) on both the upper and lower surfaces of the joint member (3) or either one of those surfaces.

(THIRD EMBODIMENT)

Figure 20:
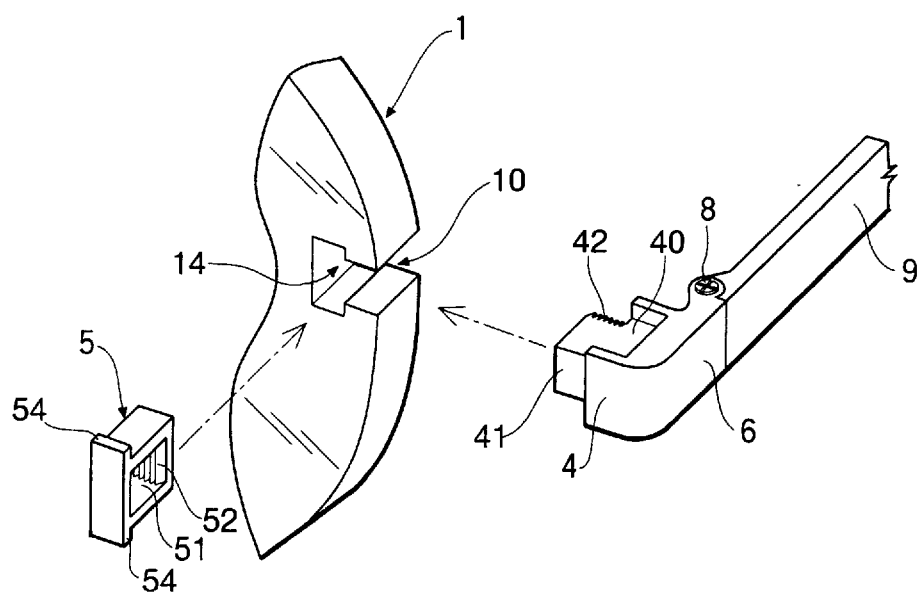
FIG. 20 exploded perspective view at the endpiece of the lens holding mechanism described in the third embodiment.
Figure 21:
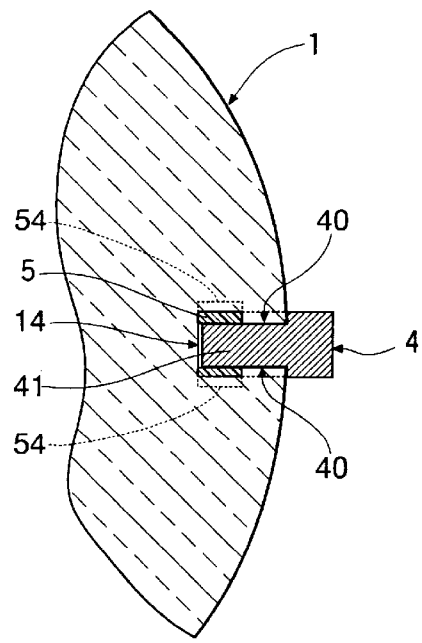
FIG. 21 is a partly cross sectional view at the endpiece showing the holding condition of the lens in the third embodiment.
Figure 22:
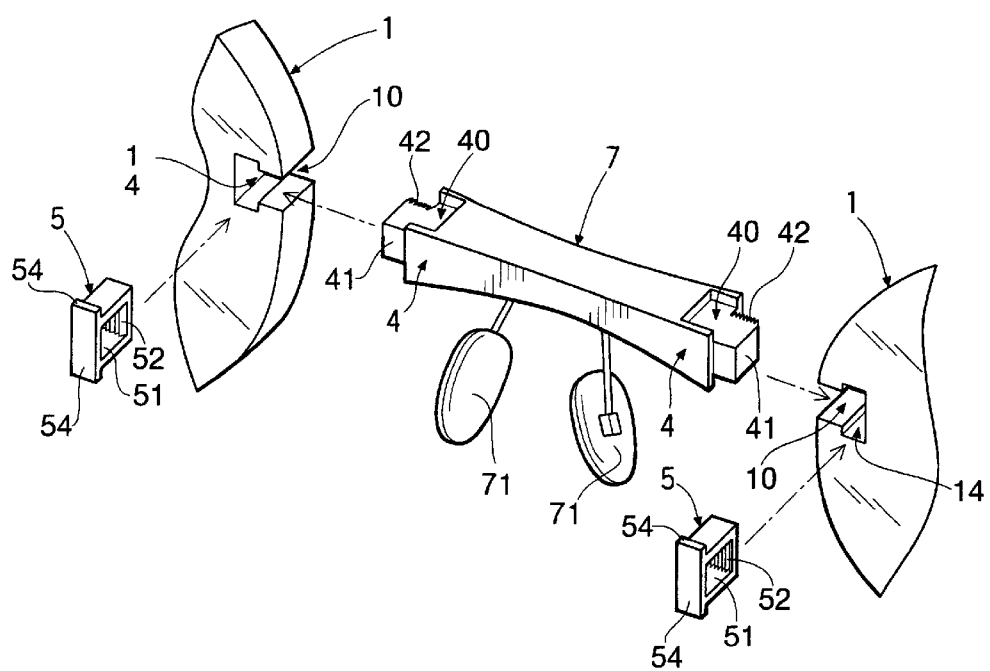
FIG. 22 is an exploded perspective view at the bridge of the lens holding mechanism described in the third embodiment.
Figure 23:
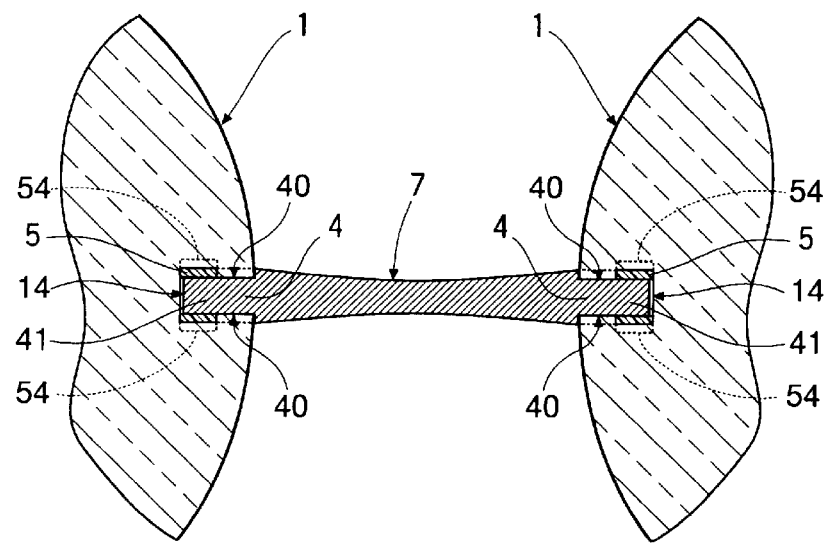
FIG. 23 is a partly cross sectional view at the bridge showing the holding condition of the lens in the third embodiment.

Then, the lens holding mechanism in the third embodiment of the present invention is described with reference to FIGS. 19 to 23. FIGS. 20 and 21 show that said mechanism is adopted at the endpiece (6) while FIGS. 22 and 23 show that it is adopted at the bridge (7).

In the drawings, what is indicated with a reference mark (1) is a pair of lenses made of a synthetic resin. A concave portion (10) is sideways notched on the inner and outer fringe sides of the lens (1) respectively. An amplified portion (14) is provided at the bottom part of this concave portion (10). In the drawings, what is indicated with a reference mark (4) is a joint member preliminarily provided in integral structure on a proximal end portion with regard to the lens of the endpiece (6) (refer to FIG. 20) and both ends of the bridge (7) (refer to FIG. 22). Both the endpieces (6) and the bridge (7) are made of a synthetic resin. Grooves (40) and (40) having the width corresponding to the lens thickness or wide enough to be inserted into the concave portion (10) of the lens (1) are provided on the upper and lower surfaces of the joint member (4) while a connecting projection (41) extending towards the lens is provided on the tip end of the joint member (4). The connecting projection (41) of the present embodiment is formed in rectangular shape, on the ocular side of which an indented portion (42) is provided. In the drawings, what is indicated with a reference mark (5) is an anchoring member made of a synthetic resin, said member (5) being capable of being fitted into the amplified portion (14) and at the center of which a connecting hole (51) is opened, said hole (51) being capable of receiving the connecting projection (41) of the joint member (4). A counterpart indented portion (52) is provided on the inner surface of said connecting hole (51), this counterpart portion (52) being capable of being fitted into the indented portion (42) of the connecting projection (41). By engaging the indented portion (42) to its counterpart (52), the connecting projection (41) of the joint member (4) can be fixed onto the connecting hole (51) of the anchoring member (5). As well, in the present embodiment, flanges (54) and (54) are each provided on the upper and lower fringes opposite to the fringe side of the anchoring member (5) on which the counterpart indented portion (52) is provided, thereby, facilitating the insertion of the anchoring member (5) into the amplified portion (14).

By fitting this anchoring member (5) into the amplified portion (14) from the frontal side of the lens and then inserting the grooves (40) and (40) of the joint member (4) into the concave portion (10) of the lens so as to put the connecting projection (41) of the joint member (4) into the connecting hole (51) of the anchoring member (5), it becomes possible to securely fix the lenses with the endpieces (6) and the bridge (7), so that a pair of rimless spectacles (refer to FIG. 19) can be assembled in an extremely simple manner.

In this way, with the lens holding mechanism of the present embodiment, since the lenses are held in check by engaging the joint member (4) inserted into the concave portion (10) of the lens (1) by way of the grooves (40) and (40) provided on the upper and lower surfaces of said member (4) with the anchoring member (5) fitted into the amplified portion (14) of the concave portion (10) from the frontal side of the lens, it becomes unnecessary to attach support members on the endpieces (6) and the bridge (7) as in the conventional rimless spectacles, with the result that it can not only considerably simplify the lens holding mechanism, but also enhance the simplicity of the design of the rimless spectacles. Likewise, because an assemble screw to hold the lens in check can be removed, there is no case where its head does damage on the appearance or narrows the wearers' field of vision as in the conventional rimless spectacles.

Moreover, with the lens holding mechanism of the present embodiment, since the side surfaces (refer to dotted lines in FIGS. 21 and 23) slightly extending from the upper and lower grooves (40) and (40) of the joint member (4) lie over the surface of the lens (1) around the concave portion (10), the joint member (4) is stably fixed on the concave portion (10) in the same way as the first embodiment so that it becomes possible to securely hold the lenses in check without the anchoring member (5) slipping out of said amplified portion (14).

Also, not only because the side surfaces extending from the upper and lower grooves (40) and (40) can cover and hide a portion of the lens where said grooves (40) and (40) engage said concave portion (10), but also because the flanges (54) and (54) of the anchoring member (5) can cover and hide a portion of the lens where said member (5) is fitted into the amplified portion (14), there is no case where those portions do damage on the shapely appearance of the rimless spectacles.

The third embodiment of the present invention has been substantially described up to here, but it is not limited to the foregoing and can be modified in various manners within the scope of the accompanying patent claims.

For example, although the third embodiment shows two grooves (40) and (40) each provided on the upper and lower surfaces of the joint member (4), it is not limited to this arrangement. It does not matter whether a groove (40) is provided on either the upper or lower surface of the joint member (4). In the present invention, the most important thing is that the end surface of the joint member (4) partially diminishes in thickness by providing a groove (40) on both the upper and lower surfaces thereof or either one of those surfaces.

Likewise, although the third embodiment shows flanges (54) and (54) each provided on the upper and lower fringes of the anchoring member (5), those flanges are not necessarily essential to the present embodiment. As mentioned above, because the anchoring member (5) is securely engaged with the joint member (4) fitted into the concave portion (10), there is no case where said member (5) slips out of the amplified portion (14) even without providing those flanges (54) and (54) thereon.

(FOURTH EMBODIMENT)

Figure 24:
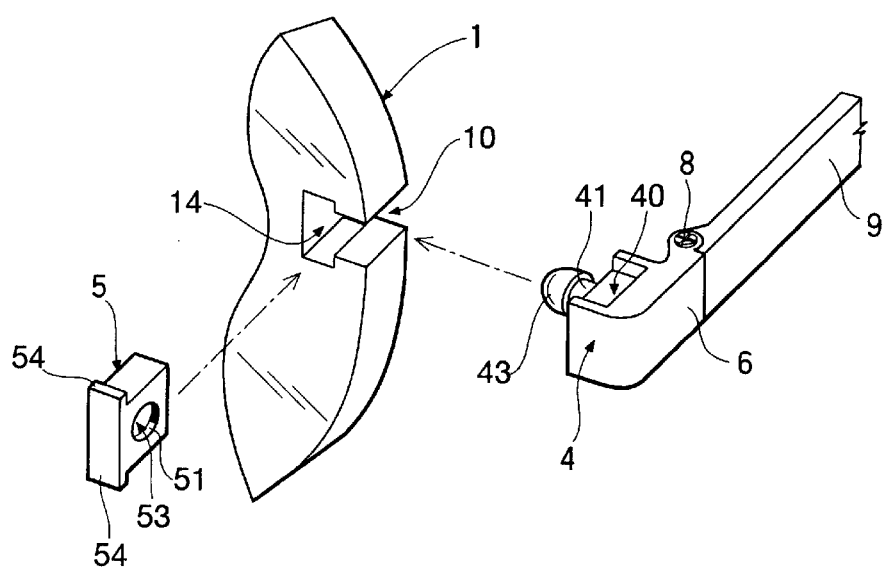
FIG. 24 is an exploded perspective view at the endpiece of the lens holding mechanism described in the fourth embodiment of the present invention.
Figure 25:
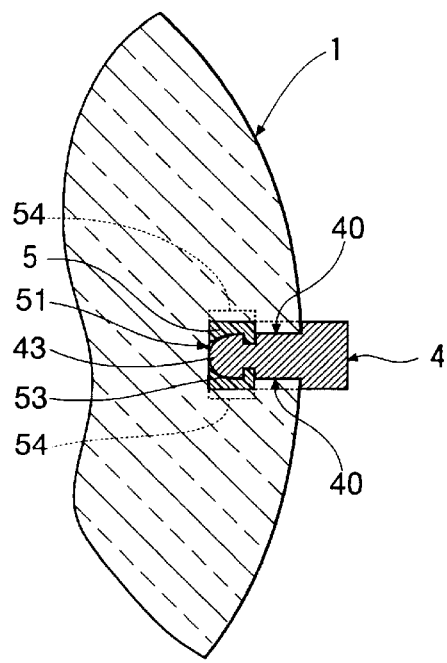
FIG. 25 is a partly cross sectional view at the endpiece showing the holding condition of the lens in the fourth embodiment.
Figure 26:
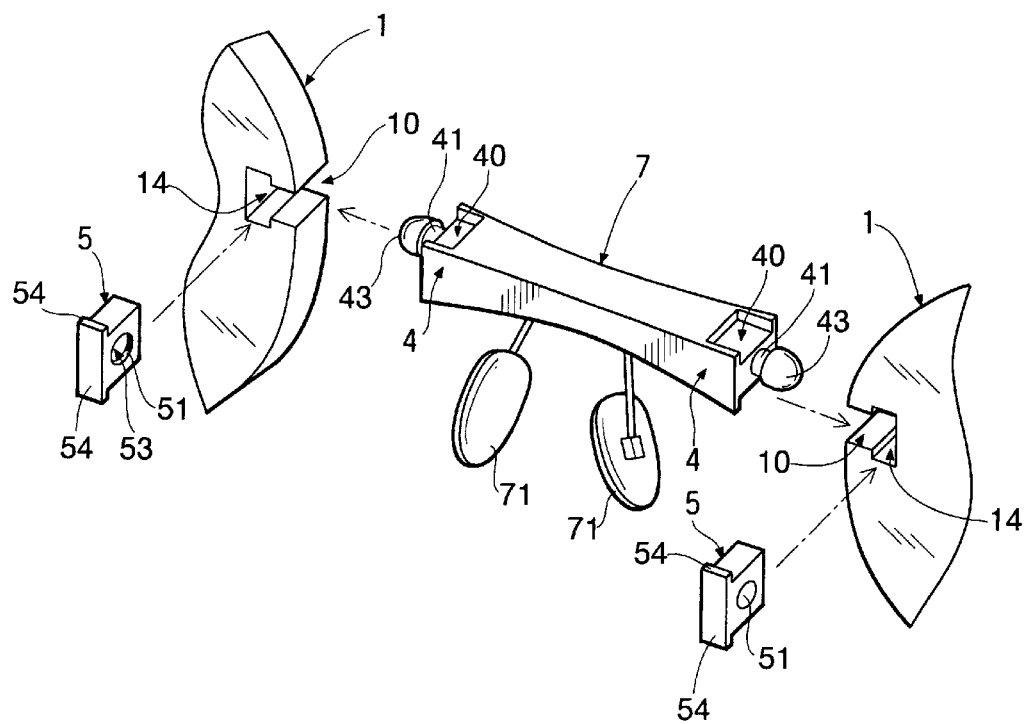
FIG. 26 is an exploded perspective view at the bridge of the lens holding mechanism described in the fourth embodiment.

Then, the lens holding mechanism in the fourth embodiment of the present invention is described with reference to FIGS. 24 to 27. FIGS. 24 and 25 show that said mechanism is adopted at the endpiece (6) while FIGS. 26 and 27 show that it is adopted at the bridge (7).

The lens holding mechanism of the present embodiment is characterized in the shape of the connecting projection (41) of the joint member (4) as well as that of the connecting hole (51) of the anchoring member (5), and other structural elements such as the amplified portion (14) of the lens (1) are the same as those of the third embodiment. That is to say, in the present embodiment, as shown in FIGS. 24 and 26, while a mushroom connecting projection (41) having a substantially hemispherical convex head portion (43) is provided on the tip end of the joint member (4), a counterpart concave portion (53) capable of receiving said portion (43) is provided on the inner surface of the connecting hole (51) of the anchoring member (5). The connecting projection (41) is fixed onto the connecting hole (51) by fitting this convex portion (43) of the joint member (4) into its counterpart (53) of the anchoring member (5).

By fitting this anchoring member (5) into the amplified portion (14) of the lens (1) and then inserting the grooves (40) and (40) of the joint member (4) into the concave portion (10) of the lens (1) so as to put the connecting projection (41) into the connecting hole (51) of the anchoring member (5), it becomes possible to securely fix the lenses with the endpieces (6) and the bridge (7), so that a pair of rimless spectacles can be assembled in an extremely simple manner (refer to FIGS. 25 and 27).

In this way, with the lens holding mechanism of the present embodiment, since the lenses are held in check by engaging the joint member (4) inserted into the concave portion (10) of the lens (1) by way of the grooves (40) and (40) provided on the upper and lower surfaces of said member (4) with the anchoring member (5) fitted into the amplified portion (14) of the concave portion (10) from the frontal side of the lens, it becomes unnecessary to attach support members on the endpieces (6) and the bridge (7) as in the conventional rimless spectacles, with the result that it can not only considerably simplify the lens holding mechanism, but also enhance the simplicity of the design of the rimless spectacles. Likewise, because an assemble screw to hold the lens in check can be removed, there is no case where its head does damage on the appearance or narrows the wearers' field of vision as in the conventional rimless spectacles.

Moreover, with the lens holding mechanism of the present embodiment, since the side surfaces (refer to dotted lines in FIGS. 25 and 27) extending from the upper and lower grooves (40) and (40) of the joint member (4) lie over the surface of the lens (1) around the concave portion (10), the joint member (4) is stably fixed on the concave portion (10) in the same way as the first embodiment so that it becomes possible to securely hold the lenses in check without the anchoring member (5) slipping out of said amplified portion (14).

Also, not only because the side surfaces slightly extending from the upper and lower grooves (40) and (40) can cover and hide a portion of the lens where said grooves (40) and (40) engage the concave portion (10), but also because the flanges (54) and (54) of the anchoring member (5) can also cover and hide a portion of the lens where said member (5) is fitted into the amplified portion (14), there is no case where those portions do damage on the shapely appearance of the rimless spectacles.

The fourth embodiment of the present invention has been substantially described up to here, but it is not limited to the foregoing and can be modified in various manners within the scope of the accompanying patent claims.

For example, although the fourth embodiment shows two grooves (40) and (40) each provided on the upper and lower surfaces of the joint member (4) in the same way as the third embodiment, it is not limited to this arrangement. It does not matter whether a groove (40) is provided on either the upper or lower surface of the joint member (4). In the present invention, the most important thing is that the end surface of the joint member (4) partially diminishes in thickness by providing a groove (40) on both the upper and lower surfaces of the joint member (4) or either one of those surfaces.

Also, although the fourth embodiment shows flanges (54) and (54) each provided on the upper and lower fringes of the anchoring member (5) in the same way as the third embodiment, those flanges are not necessarily essential to the present embodiment. As mentioned above, because the anchoring member (5) is securely engaged with the joint member (4) fitted into the concave portion (10), there is no case where said member (5) slips out of the amplified portion (14) even without providing those flanges (54) and (54) thereon.

INDUSTRIAL APPLICABILITY

As having been described up to here, the lens holding mechanism of a pair of rimless spectacles embodied in the present invention can realize most secure holding of the lenses without an intricate structure therefore as in the prior arts, so that its industrial applicability is very high.

I claim:

1. A lens holding mechanism of spectacles comprising:

a lens on the side portion of which a concave portion is notched, at least one projection being provided on both the upper and lower surfaces of said concave portion or either one of those surfaces; and a joint member provided on a proximal end portion with regard to the lens of an endpiece engaging a temple or both ends of a bridge interengaging a pair of said lenses juxtaposed to each other, on both the upper and lower surfaces of said joint member or either one of those surfaces a groove having width corresponding to the lens thickness and wide enough to be fitted into said concave portion being provided, on the surface of said groove at least one recess capable of receiving said projection being formed, wherein the groove of said joint member engages the concave portion of the lens so as to cause said recess to fit into the projection, thereby, the lens being securely held in check with one of the endpiece and the bridge.

2. A lens holding mechanism of spectacles comprising:

a lens on the side portion of which a concave portion is notched, at least one recess being provided on both the upper and lower surfaces of said concave portion or either one of those surfaces; and a joint member provided on a proximal end portion with regard to the lens of an endpiece engaging a temple or both ends of a bridge interengaging a pair of said lenses juxtaposed to each other, on both the upper and lower surfaces of said joint member or either one of those surfaces a groove having width corresponding to the lens thickness and wide enough to be fitted into said concave portion being provided, on the surface of said groove at least one projection capable of being fitted into said recess being formed, wherein the groove of said joint member engages the concave portion of the lens so as to cause said projection to fit into the recess, thereby, the lens being securely held in check with one of the endpiece and the bridge.

3. A lens holding mechanism of spectacles comprising:

a lens on the side portion of which a concave portion is notched, at least one recess being provided on both the frontal and rear surfaces of the lens beside said concave portion or either one of those surfaces; and a joint member provided on a proximal end portion with regard to the lens of an endpiece engaging a temple or both ends of a bridge interengaging a pair of said lenses juxtaposed to each other, on both the upper and lower surfaces of said joint member or either one of those surfaces a groove having width corresponding to the lens thickness and wide enough to be fitted into said concave portion being provided while on both sides of said joint member or either one of those sides a flange portion having at least one projection capable of being fitted into said recess being formed, wherein the groove of said joint member engages the concave portion of the lens so as to cause said projection to fit into the recess, thereby, the lens being securely held in check with one of the endpiece and the bridge.

4. A lens holding mechanism of spectacles comprising:

a lens on the side portion of which a concave portion is notched, an amplified portion being provided at the bottom of said concave portion;

a joint member provided on a proximal end portion with regard to the lens of an endpiece engaging a temple or both ends of a bridge interengaging a pair of said lenses juxtaposed to each other, on both the upper and lower surfaces of said joint member or either one of those surfaces a groove having width corresponding to the lens thickness and wide enough to be fitted into said concave portion being provided while at the tip end thereof a connecting projection being provided; and an anchoring member fitted into the amplified portion of said lens and having a connecting hole capable of receiving the connecting projection of the joint member, wherein the groove of said joint member engages the concave portion of the lens so as to cause said connecting projection to fit into the connecting hole of the anchoring member fitted into the amplified portion, thereby, the lens being securely held in check with one of the endpiece and the bridge.

5. A lens holding mechanism of spectacles according to claim 4 wherein at least one indented portion is formed on the circumferential surface of the connecting projection of the joint member while a counterpart indented portion capable of engaging said indented portion is formed on the inner surface of the connecting hole of the anchoring member.

6. A lens holding mechanism of spectacles according to claim 4 wherein the connecting projection of the joint member is formed in mushroom shape with a convex head portion at the tip end while a counterpart concave portion capable of receiving said convex head portion is provided on the inner surface of the connecting hole of the anchoring member.

* * * * *